Jan. 7, 1969     H. JÄGER     3,419,968
APPARATUS FOR DRYING AND PRE-HEATING OF PULVERULENT
MATERIAL, PARTICULARLY RAW CEMENT MATERIAL
Filed June 16, 1967

INVENTOR
HEINZ JÄGER

ATTORNEY

United States Patent Office 3,419,968
Patented Jan. 7, 1969

3,419,968
APPARATUS FOR DRYING AND PRE-HEATING OF PULVERULENT MATERIAL, PARTICULARLY RAW CEMENT MATERIAL
Heinz Jäger, Bochum, Germany, assignor to Westfalia Dinnendahl Groppel Aktiengesellschaft, Bochum, Germany, a corporation of Germany
Filed June 16, 1967, Ser. No. 646,669
U.S. Cl. 34—57                7 Claims
Int. Cl. F26b 17/10

ABSTRACT OF THE DISCLOSURE

In order to reduce the structural height formerly required due to the series connection of the plurality of cyclone separators, and to reduce the suction force for drawing the kiln gases through the pre-heater, the present invention comprises a pressure-drop chamber 5 located at each heating stage and having a rectangular cross-section in plan view and provided with a funnel-shaped bottom 8. The pulverulent material to be processed is fed in through a feed pipe 3 into the hot gas inlet duct 6 of the uppermost cyclone stage A and carried by the rising heating gases into the cyclone 4, where the material is precipitated and delivered downwardly to the next lower pre-heating stage B, where it enters a pressure-drop chamber 5 while coming into contact with the rising heating gas. The flow of hot gases leading into the expansion chamber is in a direction transverse to the flow of the supply of pulverulent material thereinto.

SUMMARY OF THE INVENTION

The present invention relates to apparatus for the drying and pre-heating of pulverulent material, particularly cement raw material. Apparatus of this general type has become known wherein several pre-heating stages are arranged above one another and through which heating gases, for example, the exhaust gases of a rotary cylindrical furnace or kiln, are passed in sequence. The material to be processed is fed to the uppermost cyclone, i.e. the cyclone furthest removed from the heat source. The cyclone separators are customarily arranged above one another, in two parallel rows, and staggered so as to alternately fill the space in the two rows. In these known devices, the material is processed in counter-current flow relative to the heating gases. However, this type of construction of the prior art for a drying and pre-heating installation requires a relatively great structural height, and furthermore requires a relatively great force to draw the heating gases through the apparatus.

It is therefore an object of the present invention to improve such apparatus for drying and pre-heating by providing each heating stage with a pressure-drop chamber or expansion chamber wherein the material to be heated is essentially taken hold of by transverse currents of the flowing gas, which results in a close contact of the solid pulverulent material with the heating gas, ensuring better heat transfer from the gas to the material.

Another object of the invention is to make it possible to have the heating gas flow at a lower velocity in the expansion chamber, so as to provide a longer duration of time for the solid particles to remain in the chamber in contact with the heating gas.

To these ends, and in accordance with the invention, each heating stage is provided with a pressure-drop or expansion chamber having a rectangular cross-section and a funnel-shaped bottom. When the expansion chambers have a greater expansion of length, their bottoms may be constructed as a plurality of adjacent funnels (not shown). An inlet duct for the heating gas opens into the expansion chamber, and an outlet suction duct on the opposite side of the expansion chamber exhausts the gases therefrom and is joined to the inlet duct of the next upper stage. A feed pipe for introducing solid pulverulent material which has been precipitated in a preceding stage opens into the top cover of each expansion chamber. Thus, the raw material is fed first into the intake duct of the first pre-heating stage, which is constructed as a cyclone stage. In this novel construction, the material discharged down into the expansion chamber is picked up by the transverse currents, and this results in an intimate contact of the solid pulverulent material with the heating gas, ensuring efficient heat transfer. The heat transfer is further promoted by the fact that the velocity of the gas flowing through the expansion chamber is much lower than it is in the duct, which affords a longer duration of the solid particles within the chamber. The individual heating stages form structural units of relatively low height stacked one upon another and forming a self-supporting structure.

The foregoing and other objects, features and many of the attendant advantages of this invention will be readily appreciated as the same becomes better understood by reference to the following detailed description in conjunction with one embodiment of an apparatus according to the invention illustrated by way of the example on the accompanying drawing, in which.

Figure 1:
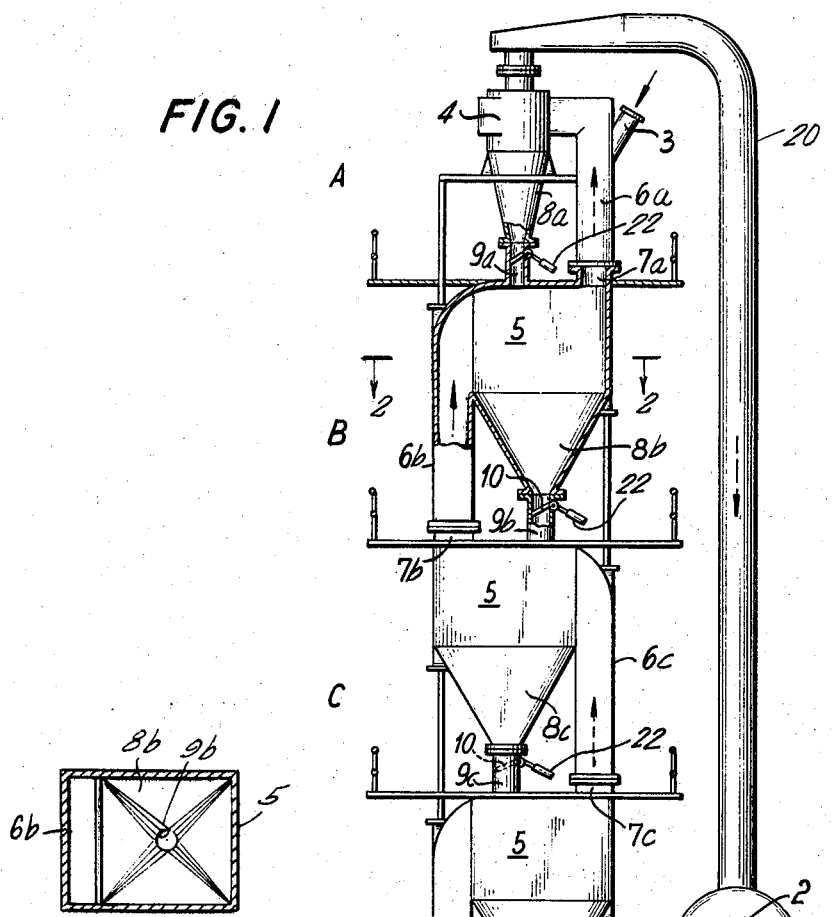
FIG. 1 illustrates, in vertical elevation view, partially cut away, the arrangement of four stages of a pre-heating unit in accordance with the invention.
Figure 2:
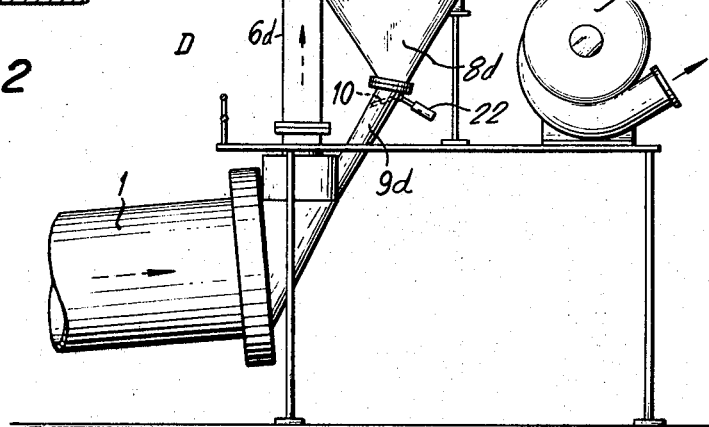
FIG. 2 is a cross-section taken along the plane of line 2—2 of FIG. 1.

As shown in FIG. 1, the drying and pre-heating apparatus according to the invention is composed of a plurality of pre-heating stages A, B, C, D, which are connected in sequence and joined to the rotary kiln 1 by means of the hot gas exhaust duct 6d and the kiln pre-heated raw material feed duct 9d. A blower 2 provides suction to draw the hot exhaust gases from the kiln 1 through the drying and pre-heating apparatus and from thence out through the waste gas outlet duct 20, and after passing it through the blower 2, the waste gases are passed through a filter (not shown) for precipitating the fine dust entrained therein. Delivery of the material to be processed is effected through the short feed pipe 3. The first pre-heating stage A comprises one or more cyclone separators 4. Each of the pre-heating stages B, C and D comprises a pressure-drop or expansion chamber 5, rectangular in horizontal cross-section, and which is equipped with a hot gas inlet duct 6a, 6b and 6c, and a suction duct 7a, 7b, 7c at the opposite side and extending through the top of the chamber. It will be noticed that the sequential hot gas ducts 6a, 6b, 6c and 6d are staggered, i.e. they are disposed on opposite sides of the sequential stages. Similarly, the suction outlet ducts 7a, 7b and 7c are disposed alternately in staggered relation to each other and on opposite sides from the inlet ducts relative to the expansion chambers 5. This is in order to obtain maximum transverse flow of the gases through the respective expansion chambers 5.

The expansion chambers 5 each have a funnel-shaped or hopper-shaped bottom 8b, 8c and 8d, and a respective discharge outlet 9b, 9c and 9d. Of course, the cyclone separator 4 also has a funnel-shaped bottom 8a and a discharge outlet 9a. Each of the discharge outlets 9a, 9b, 9c and 9d is provided with a flap valve 10 having a counterweight 22 which serves to normally keep the valve 10 closed, but permits it to open when the material collected in the respective collection hoppers 8a, 8b, 8c and 8d exceeds a predetermined amount. The respective outlet ducts 9a, 9b and 9c discharge downwardly through the covers of the respective expansion chambers 5 of the next lower stages B, C or D. The discharge duct 9d of the lowermost stage D discharges into the rotary cylindrical kiln 1. The expansion chambers 5, arranged one above another, are displaced relative to each other by 180-degrees, considered in successively arranged horizontal sections so that the suction outlet duct 7c of the lowermost pressure drop chamber 5 is aligned with and adjacent the inlet duct 6c of the next following chamber 5 of stage C, etc.

The mode of operation of the apparatus according to the invention is as follows. The pulverulent raw material to be dried or pre-heated is fed in at feed pipe 3 into the inlet duct 6a of the uppermost cyclone stage A and is carried by the rising heating gases of duct 6a into the cyclone separator 4 where the material is precipitated out and drops down into the collecting hopper 8a, from which it is fed via discharge duct 9a and its flap 10 to the expansion chamber 5 of the next lower stage B, where it comes in contact with the heating gas flowing in cross current through the hot gas inlet duct 6b. Due to the expansion which takes place in the pressure-drop chamber 5, the solid pulverulent material precipitates out to a considerable extent and is collected in the funnel-shaped bottom 8b, from which it is delivered, via the discharge nozzle 9b with its flap valve 10 counterweighted by weight 22, to the next following expansion chamber 5 below. This same process is repeated in the successive lower stages C and D, and the pre-heated material collecting in the lowermost funnel-shaped bottom 8d is discharged through the kiln feed duct 9d for further processing.

It will be obvious to those skilled in the art, upon studying this disclosure, that apparatus according to my invention can be modified in various respects and hence may be embodied in constructions other than as particularly illustrated and described herein, without departing from the essential features of my invention and within the scope of the claims annexed hereto.

I claim:

1. Apparatus for drying and preheating pulverulent material comprising a plurality of sequentially arranged separator stages (A, B, C, D), an expansion chamber (5) having a horizontally square cross section forming part of at least one of said separator stages, means for supplying a pulverulent material to be preheated to said expansion chamber, hot gas duct means for delivering hot gases to said expansion chamber and including hot gas inlet means leading into said expansion chamber in a direction transverse to the flow of the supply of the pulverulent material thereinto, said expansion chamber being provided with a bottom defining at least one generally funnel shape, and means forming a suction outlet duct in said one separator stage.

2. Apparatus according to claim 1, including duct means connecting said outlet duct with the hot gas inlet means of a next sequentially arranged separator.

3. Apparatus according to claim 1, said means for supplying material comprising a feed pipe opening leading into said hot gas duct means.

4. Apparatus according to claim 3, said plurality of separators including an uppermost separator provided with a hot gas inlet forming part of said hot gas duct means, said feed pipe having an opening leading into said hot gas duct means at a location near said hot gas inlet of said uppermost of said separator.

5. Apparatus according to clim 1, said means for supplying material comprising a feed pipe opening into said duct means connecting said outlet duct with the hot gas inlet duct of said next sequentially arranged separator stages.

6. Apparatus according to claim 1, said expansion chamber being of a dimension and arranged relative to said hot gas inlet means so as to cause a pressure drop in said expansion chamber.

7. Apparatus according to claim 1, said plurality of sequentially arranged cyclone separators defining a series of successive stages arranged in successively higher horizontal planes rotated 180° relative to the preceding plane so that the hot gas inlet means of a respective expansion chamber is directly connected to and receives hot gases directly from the suction outlet duct of a preceding expansion chamber.

References Cited

UNITED STATES PATENTS

| | | | |
|---|---|---|---|
| 2,648,532 | 8/1953 | Muller et al. | 34—168 XR |
| 2,802,280 | 8/1957 | Sylvest | 34—57 |
| 3,317,201 | 5/1967 | Muller et al. | 263—32 |
| 3,319,349 | 5/1967 | Heinemann | 263—32 XR |

FREDERICK L. MATTESON, JR., *Primary Examiner.*

ALLAN D. HERRMANN, *Assistant Examiner.*

U.S. Cl. X.R.

34—168